(12) United States Patent
Saad et al.

(10) Patent No.: US 12,243,288 B2
(45) Date of Patent: Mar. 4, 2025

(54) CHROMATIC UNDERTONE DETECTION

(71) Applicant: Adobe Inc., San Jose, CA (US)

(72) Inventors: Michele Saad, Austin, TX (US); Ronald Oribio, Austin, TX (US); Robert W. Burke, Jr., Georgetown, TX (US); Irgelkha Mejia, Round Rock, TX (US)

(73) Assignee: Adobe Inc., San Jose, CA (US)

( * ) Notice: Subject to any disclaimer, the term of this patent is extended or adjusted under 35 U.S.C. 154(b) by 481 days.

(21) Appl. No.: 17/704,030

(22) Filed: Mar. 25, 2022

(65) Prior Publication Data

US 2023/0306714 A1  Sep. 28, 2023

(51) Int. Cl.

| | |
|---|---|
| *G06V 10/764* | (2022.01) |
| *G06T 3/10* | (2024.01) |
| *G06T 7/10* | (2017.01) |
| *G06T 7/90* | (2017.01) |
| *G06V 10/56* | (2022.01) |
| *G06V 10/60* | (2022.01) |

(Continued)

(52) U.S. Cl.
CPC .......... *G06V 10/764* (2022.01); *G06T 3/10* (2024.01); *G06T 7/10* (2017.01); *G06T 7/90* (2017.01); *G06V 10/56* (2022.01); *G06V 10/60* (2022.01); *G06V 10/75* (2022.01); *G06V 10/7747* (2022.01); *G06T 2207/10024* (2013.01); *G06T 2207/20021* (2013.01); *G06T 2207/20081* (2013.01)

(58) Field of Classification Search
CPC ...... G06V 10/764; G06V 10/56; G06V 10/60; G06V 10/75; G06V 10/7747; G06T 3/10; G06T 7/10; G06T 7/90; G06T 2207/10024; G06T 2207/20021; G06T 2207/20081; G06T 2207/20084; H04N 1/6077
USPC .................................. 382/159, 165; 356/402
See application file for complete search history.

(56) References Cited

U.S. PATENT DOCUMENTS

| | | | |
|---|---|---|---|
| 6,236,460 B1 * | 5/2001 | Johnson | G01N 21/532 |
| | | | 106/436 |
| 11,010,894 B1 * | 5/2021 | Shenk | G06V 40/10 |

(Continued)

OTHER PUBLICATIONS

X-Rite Inc., A Guide to Understanding Color Communication, https://www.tqmsystems.nl/uploads/Understand_Color_en.pdf 2007, pp. 1-26.

*Primary Examiner* — Kathleen Y Dulaney
(74) *Attorney, Agent, or Firm* — Kilpatrick Townsend & Stockton LLP

(57) ABSTRACT

Certain aspects and features of this disclosure relate to chromatic undertone detection. For example, a method involves receiving an image file and producing, using a color warmth classifier, an image warmth profile from the image file. The method further involves applying a surface-image-trained machine-learning model to the image warmth profile to produce an inferred undertone value for the image file. The method further involves comparing, using a recommendation module, and the inferred undertone value, an image color value to a plurality of pre-existing color values corresponding to a database of production images, and causing, in response to the comparing, interactive content including the at least one production image selection from the database of production images to be provided on a recipient device.

20 Claims, 8 Drawing Sheets

(51) Int. Cl.
*G06V 10/75* (2022.01)
*G06V 10/774* (2022.01)

(56) References Cited

U.S. PATENT DOCUMENTS

| | | | |
|---|---|---|---|
| 2015/0186965 A1* | 7/2015 | Paul | G06Q 30/0613 235/494 |
| 2015/0339757 A1* | 11/2015 | Aarabi | G06Q 30/0631 705/26.7 |
| 2023/0074782 A1* | 3/2023 | Tendulkar | G06V 10/56 |

* cited by examiner

CHROMATIC UNDERTONE DETECTION

TECHNICAL FIELD

The present disclosure generally relates to computerized digital image analysis. More specifically, but not by way of limitation, the present disclosure relates to programmatic techniques for accurately identifying chromatic undertones in digital images and automatically providing interactive content such as other images selected based on the chromatic undertones.

BACKGROUND

In color perception, an undertone is a subdued color seen through and modifying another color. Such an undertone can thus be described as a color-based, or chromatic, impression of an environmental scene or object that is distinct from the specific, readily identified colors present in the scene or object. Identification of chromatic undertones can be used to provide more visually salient color selections for makeup, clothing, paint, architectural interiors, architectural exteriors, and landscapes, as examples. Undertone identification can also be important in selecting appropriate lighting for photography, videography, and cinematic production design.

SUMMARY

Certain aspects and features of the present disclosure relate to chromatic undertone detection. For example, a method involves receiving an image file and producing, using a color warmth classifier, an image warmth profile from the image file. The method further involves applying a surface-image-trained machine-learning model to the image warmth profile to produce an inferred undertone value for the image file. The method further involves comparing, using a recommendation module, and the inferred undertone value, an image color value to a plurality of pre-existing color values corresponding to a database of production images, and causing, in response to the comparing, interactive content including at least one production image selection from the database of production images to be provided to a recipient device.

Other embodiments of this aspect include corresponding computer systems, apparatus, and computer programs recorded on one or more computer storage devices, each configured to perform the actions of the methods.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
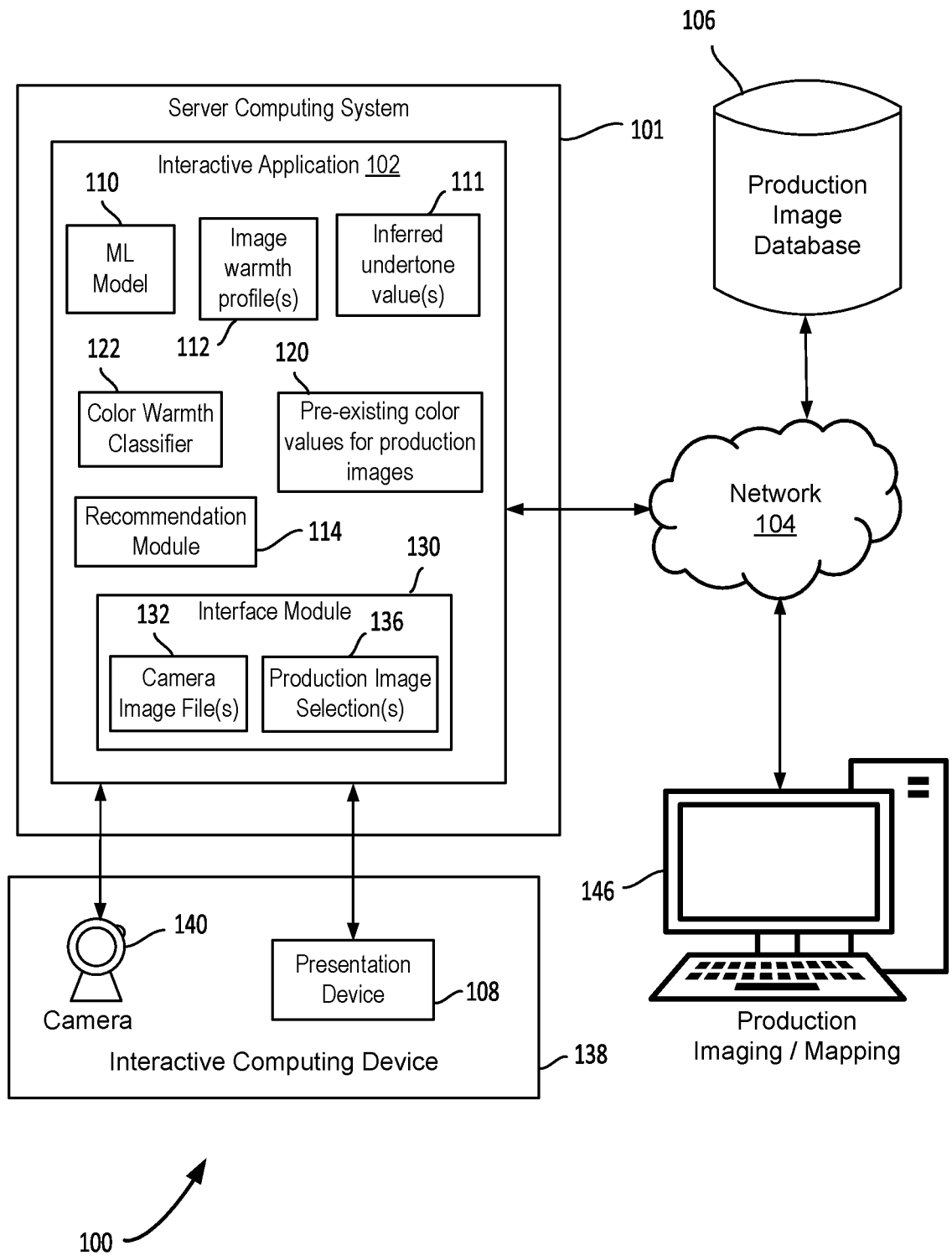
FIG. 1 is a diagram showing an example of a computing environment for chromatic undertone detection, according to certain embodiments.

As described above, undertone identification can be important in evaluating makeup, clothing, paint, and architectural environments, as well as in selecting or adjusting for lighting in various endeavors. One currently available path for undertone determination involves presenting samples and possibly information about the samples to a person selecting a product or configuring an environment. This presentation may be accompanied by computer-generated questions, the answers to which can be fed into a rule-based undertone determination algorithm. Such a technique can be used, as an example, to provide product recommendations in an online shopping environment.

Another currently available path for undertone determination involves providing an experienced, compensated, expert to observe samples, skin, and/or lighting and provide an assessment of undertones present, possibly with computerized or printed guidance, for example, at a makeup counter in a department store. These paths produce results that can be subjective, leading to unpredictable and sometimes undesirable results. For example, two clothing items may exhibit matching colors that suggest the items would provide a pleasing appearance when worn together; however, the items may combine to be visually unappealing because their undertones are not compatible. As another example, makeup, hair color, and the like can be selected based on clearly exhibited colors but may prove to be visually unappealing for a given individual due to an undertone mismatch.

Expert assessment may be subject to the expert's unique biases and experiences when it comes to skin color, hair color, individual style or cultural experience. Training and experience in undertone detection for cosmetic selection has been largely reserved for certain skin tones. Experts who understand how to detect undertones are usually trained on a lighter palette, and when it comes to darker shades of skin, such experts often do not know how to assess undertone.

Current paths to undertone identification and undertone-aware product selection are thus unreliable, unpredictable, labor intensive, and/or expensive. Embodiments described herein address these issues by providing, repeatable, automatic, machine-learning-based identification of an undertone in an image of a surface, object, or scene. This accurate, computerized undertone identification can be used in product selection for a purchase or a design project. A surface-image-trained machine-learning model is applied to an image warmth profile produced from the input image using a color warmth classifier. The machine-learning model produces an inferred undertone value for the image using the image warmth profile. This inferred undertone value can be directly or indirectly compared to color values from a database of production images, for example, images of products available for purchase, or of lighting selections for use in a set design. These techniques provide for the automated selection of products or objects with colors and/or undertones that are compatible with an existing environment or surface.

For example, an interactive shopping application is loaded with an image of a shopper who desires to select appropriate makeup or clothing for the undertone of the shopper's skin. This interactive application is also connected to a production image database including images for available products indexed to pre-existing color values. These pre-existing color values can optionally be provided based on undertones determined by the same machine-learning technique that is used to determine the inferred undertone of the shopper's complexion. The shopping application can search the database, and a recommendation engine compares an image color value such as the inferred undertone value or a color mapped to that value from the input image to the pre-existing values from the database to recommend a product, or a selection of products. The shopper can choose a product with confidence in the automatic, chromatic undertone determination facilitating the selection from the most undertone-compatible products.

The interactive shopping application described above can be implemented via the Web, with an input image being supplied by the shopper using a webcam or the camera built in to an interactive computing device such as a smartphone or tablet computer. Such an interactive computing device may also be referred to herein as a recipient device. The interactive shopping application can alternatively be deployed to a kiosk or even to a desktop, notebook or tablet computer accessible by shoppers or sales personnel in a retail establishment. Lighting characteristics such as the color temperature of the light under which the input image is captured can be important to the accurate determination of the inferred undertone value. In a Web-based application, automatic color temperature detection can be used, or the shopper can be asked to input information about the lighting where the image was captured (e.g., natural light, incandescent light, florescent light). The same techniques can be used in a retail establishment, or a standardized light source can be provided in the area where shopper images are to be captured.

The machine-learning technique described herein can be used to reliably, repeatably, and efficiently identify chromatic undertones from images used in many different industries and endeavors. Examples include cosmetics, textiles, interior design, exterior design, flooring, architecture, industrial design, and entertainment. Undertones can be identified without significant expense or extensive manual effort, and used to make informed design or product choices.

As used herein, the term "undertone" is a subdued color seen through and modifying another color. Such an undertone can thus be described as a color-based, or chromatic, impression of an environmental scene or object that is distinct from the specific, readily identified colors present in the scene or object. The term "undercolor" is synonymous with the term "undertone." The phrase "chromatic undertone" in the context of this disclosure is also synonymous with the term "undertone" as the word "chromatic" is used only to distinguish the term "undertone" as used herein from the term as used in the audio processing or other arts.

The phrase "inferred undertone value" as used herein is a stored numerical representation of an undertone as determined from a digital image of an object or environment, wherein the digital image has been captured independently of any control or calibration of the digital imaging process for the computing system that is making undertone determinations as described herein. For example, an undertone determined from a digital image captured by a smartphone used by a customer of an online shopping platform can be analyzed to determine an inferred undertone value for whatever is captured in the image. The actual undertone of the object or environment that is depicted in the image cannot be directly determined by the computing system since the computing system lacks knowledge of all the variables involved in creating the image. A "surface-image-trained machine learning model" is a machine learning model that has been trained with a large number of images of surfaces exhibiting various undertones in varying lighting conditions in order to be used in determining an inferred undertone value for a new image.

A "production image" is an image of a product or some other optional selection, that can be determined to be compatible or potentially compatible with an inferred undertone. For example, if chromatic undertone detection as described herein is being used to present compatible products available in an online shopping platform, a database of production images of the various available products can be accessed and a subset of those images, or a "production image selection," can be provided and displayed via an interactive computing device. Outside of an online shopping environment, a "production image" might be an image of a finish or prop available to a theatrical production designer. A "production image" may be an image of a product itself, or it may be an image designed to represent how the product would appear in use. For example, for a cosmetic, a production image may be an image a model wearing the cosmetic product.

FIG. 1 is a diagram showing an example of a computing environment 100 for chromatic undertone detection, according to certain embodiments. The computing environment 100 includes a server computing system 101 that executes an interactive application 102, and an interactive computing device 138. The interactive computing device 138 includes a presentation device 108 that is at least at times controlled based on the interactive application 102, and a camera 140 that is used to capture images that are stored as camera image files 132 to be sent to the interface module 130 of server computing system 101. In this example, the interactive application 102 includes a surface-image-trained machine learning model 110, a recommendation module 114, and a color warmth classifier 122. Color warmth classifier 122 produces image warmth profiles 112 from the image files and these image warmth profiles are stored, at least temporarily, in order for server computing system 101 to determine an inferred undertone value and use the inferred undertone value to make recommendations. Inferred undertone values 111 are stored by interactive application 102 during the process of making recommendations. The recommendations in this example are provided in the form of production image selections 136 to be provided to interactive computing device 138 using interface module 130 and displayed on presentation device 108.

Still referring to FIG. 1, the production images in the production image selections 136 are a subset of images in production image database 106, which is accessed by interactive application 102 over network 104. Workstation 146 is used to manage and curate the images in the production image database, as well as pre-existing color values 120 for the objects or scenes represented in the production images. Pre-existing color values 120 can be stored in server computing system 101 for efficient use by the recommendation module 114 in making recommendations to be included in the product image selections 136. These pre-existing undertone values can be updated whenever the production image database is updated. For example, the server computing system may be a real or virtual Web server implementing an online shopping platform that is accessed in order to provide a shopping experience through interactive computing device 138. Production imaging and undertone mapping may be carried out by workstation 146 as new items are added or existing items are removed or changed from the merchant's inventory. These activities would result in updates to the production image database 106, which may necessitate updates to the stored, pre-existing undertone and/or color values 120. Mapping will be discussed further with reference to FIG. 2 below, and results in the pairing of undertone values with color information about stored images.

Figure 2:
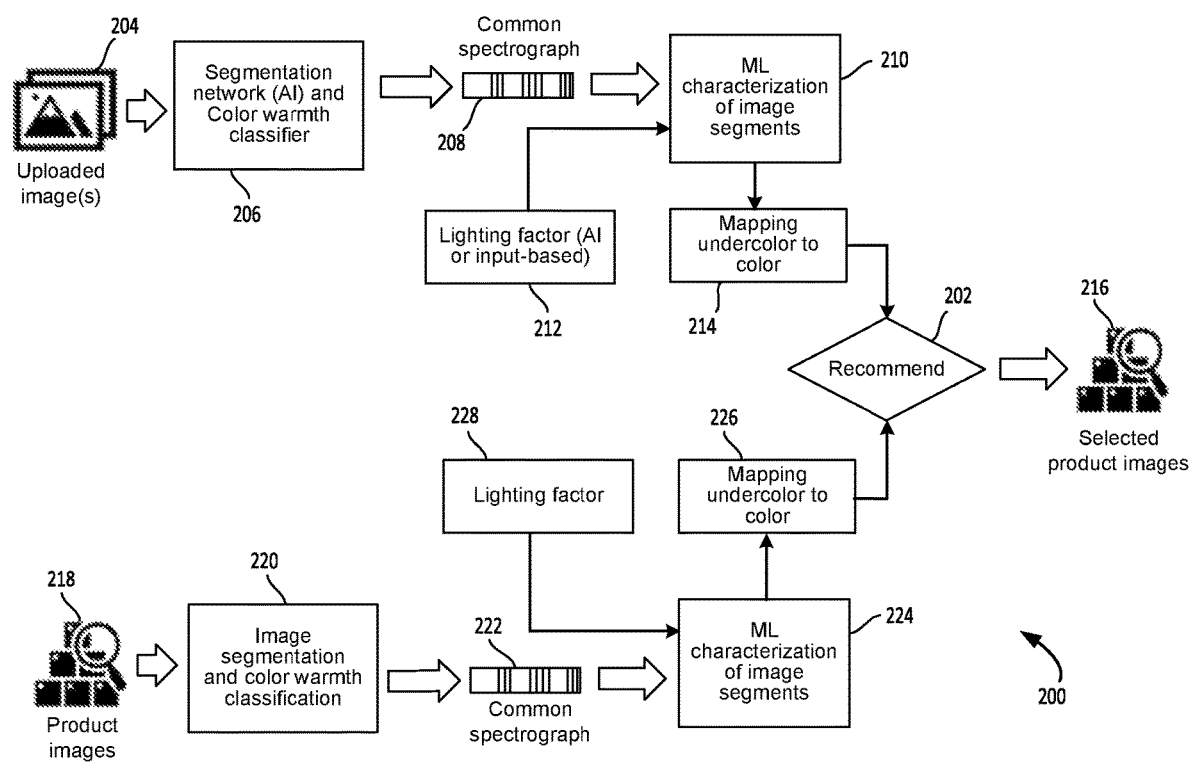
FIG. 2 is a block diagram of an example of a system for chromatic undertone detection, according to certain embodiments.

FIG. 2 is a block diagram of an example of a system 200 for chromatic undertone detection, according to certain embodiments. System 200 includes two process paths each leading to a recommendation 202 implemented by recommendation module 114. The upper process path in this example illustrates the processing of one or more uploaded images 204 from a computing device accessing interactive application 102. These images may be uploaded via a website, or alternatively, may be provided ("uploaded") to a computing device being used to implement system 200 locally, for example a tablet, notebook, or desktop computer at the makeup counter of a department store or the service counter of a paint store. A provided image is subject to image segmentation and color warmth classification in block 206 of system 200. Block 206 in this example includes a segmentation network and color warmth classifier 122. The type of image segmentation used will depend on the nature of the images, colors, and undertones involved, and for some uses, image segmentation may not be needed at all.

If image segmentation is used, any of various types of AI image segmentation, or other, non-AI types of segmentation can be used. For example, segmentation can be accomplished with a deep learning segmentation network that is included in block 206. Examples of types of segmentation include panoptic segmentation and semantic segmentation. Segmenting of an image can isolate items, portions of items, or portions of a person that are known to provide more effective measures of the undertone of interest. For example, in cosmetic selection, it is known that certain parts of the body provide more readily discernible undertones for an individual's complexion. The underside of the wrist is known to be one such area. Segmentation can be used to selectively identify a person's wrist from the person's hand, arm, etc. Color warmth classification provides a numerical indication of a color warmth category in the image in the form of an image warmth profile. For segmented images, the image warmth profile includes color warmth values indexed to segmented portions of the image. Otherwise, the color warmth value may be a unitary value for the entire image. Additional details of an example of color warmth classification are discussed below with respect to FIG. 5.

Continuing with FIG. 2, the image warmth profile is output by block 206 as common spectrograph 208. A common spectrograph is a specified numerical description of color warmth across various segments for particular types of objects. By "specified," in this context, what is meant is that the same, standardized, selection of values across various image segments is used for both uploaded images 204 and production images within the environment in which system 200 is being used. These values are stored in a file herein called a common spectrograph. Common spectrograph 208 is provided to machine learning characterization block 210 to produce one or more inferred undertone values for the image file using the surface-image-trained machine learning model 110.

In order to provide a more accurate determination, a lighting factor module 212 provides a lighting factor to the surface-trained-machine learning model. As one example, a lighting factor is a light source color characteristic. The lighting factor can be received via input to the interactive computing device. Such an input may include a selection from various light source types in which an uploaded image is captured, for example, daylight, florescent light, incandescent light, etc. Alternatively, another process can be used to analyze the image and automatically determine the lighting factor, as is accomplished with digital cameras that provide automatic white balance. An AI system can be used to provide the light source color characteristic. For example, some smartphones include an AI system in which a trained machine learning model is applied to multiple images of a scene taken together in the background as part of the camera function to determine a light source color characteristic.

Still referring to FIG. 2, the inferred undertone is provided to an optional mapping module 214. Mapping module 214 maps undercolor(s) to color(s) using a map of values for colors that are known to be compatible with certain undertones. As an example, this mapping can leverage previous, expert/high confidence mappings by using supervised machine learning for prediction and/or assignment. If system 200 is being used in an environment where recommendations will be made based on undertone to undertone comparisons, the mapping function is not needed. However, typically, there are multiple directly identifiable colors that are compatible with a certain undertone, and these identifiable colors, if present in production images, may be appropriate as available selections on interactive computing device 138. In some examples, the system can provide an adjustable filtering feature to limit or expand the number of compatible colors as a way of sifting through many production images corresponding to a large inventory of products or available design options. Recommendation module 114 carries out a recommendation function 202, comparing an image color value (color or undercolor value) produced above to pre-existing color values corresponding to the production images in database 106, and in this example, a production image selection is provided as selected product images 216 to the interactive computing device 138. Recommendation function 202 can make use of machine learning recommendation algorithms.

The bottom portion of FIG. 2 illustrates the part of system 200 that is used to create the production image database 106 from product images. Product images 218 are provided to image segmentation and color warmth classification block 220 of system 200. Block 220 includes a color warmth classifier and may also preform image segmentation similar to that described above with respect to block 206. An image warmth profile for each product image is output by block 220 as common spectrograph 222. Common spectrograph 222 is provided to machine learning characterization block 224 to produce one or more inferred undertone values for a product image file using another surface-image-trained machine learning model. The inferred undertone from a product image is output by machine learning characterization block 224 to a mapping module 226 so that pre-existing color values from production images can be compared with image color values to produce recommendations. Mapping module 226, if needed, maps undercolor to color using a map of values for colors as previously described, optionally using supervised machine learning as previously described. As with the upper portion of system 200 as described above, a lighting factor 228 is provided to the surface-trained-machine learning model in block 224. In this case, however, the lighting factor may be a fixed, stored value, as product images 218 will typically be able to be captured in a more controlled and consistent environment.

Figure 3:
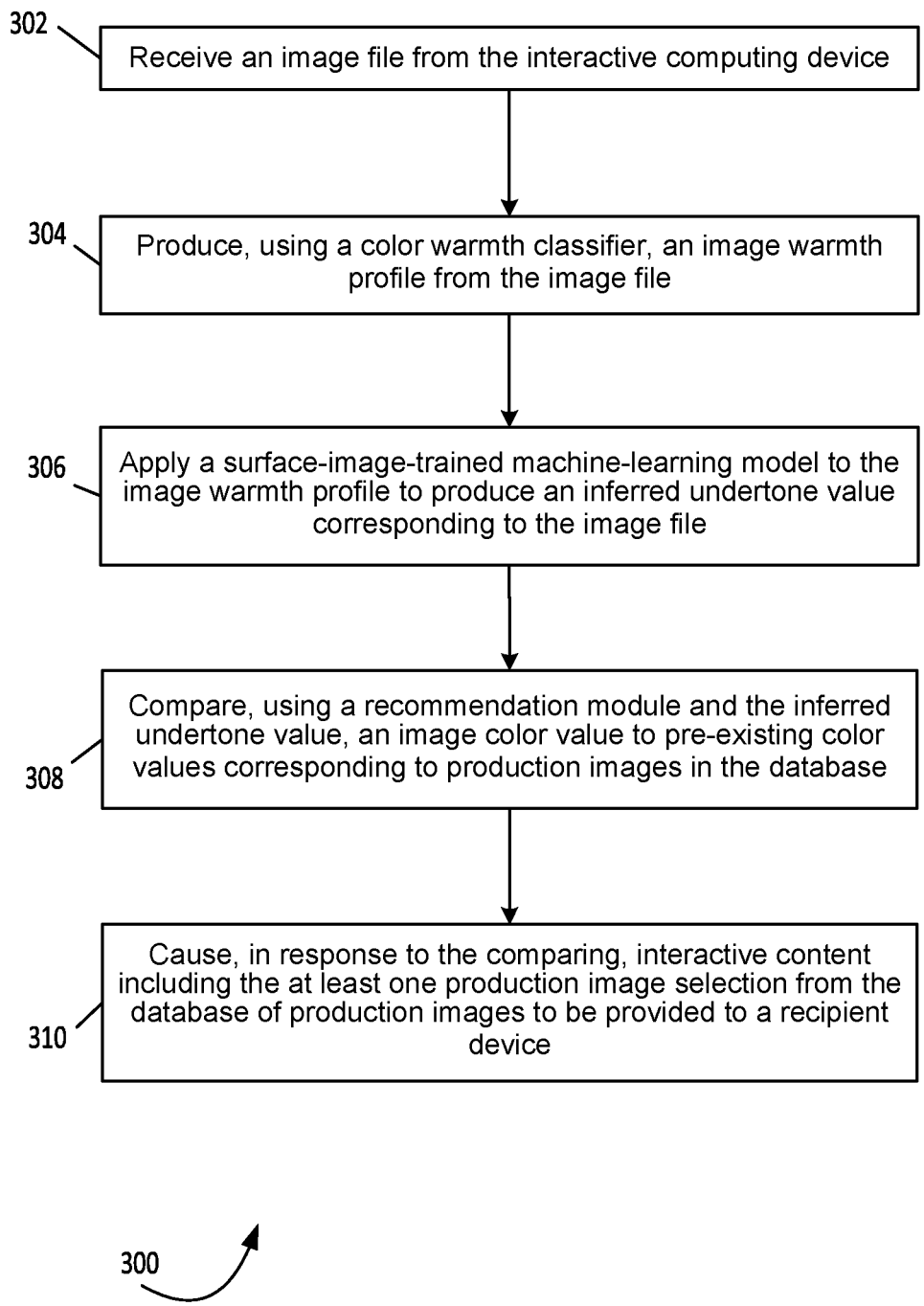
FIG. 3 is a flowchart of an example of a process for chromatic undertone detection, according to some embodiments.

FIG. 3 is a flowchart of an example of a process 300 for a chromatic undertone detection system, according to some embodiments. In this example, a computing device carries out the process by executing suitable program code, for example, computer program code executable to provide an interactive application such as interactive application 102. At block 302, the computing device running the interactive application receives an image file from the interactive computing device or directly through an interface module. At block 304, the computing device produces an image warmth profile from the image file by using a color warmth classifier. The image warmth profile may include image warmth category values for multiple segments or features of the input image or the profile may include a unitary value for the entire image. At block 306, the computing device applies the surface-image-trained machine learning model to the image warmth profile to produce and inferred undertone value corresponding to the image file.

At block 308 of process 300 the computing device compares, using a recommendation module and the inferred undertone value, an image color value corresponding to the input image to pre-existing color values corresponding to production images in the database of production images. In some examples, the image color value is the inferred undertone value. In other examples, the image color value is a color mapped to the inferred undertone value, optionally using supervised machine learning as previously described. At block 310, the computing device causes, in response to the comparing, interactive content to be provided to a recipient device such as interactive computing device 138. This interactive content includes at least one production image selection from the database of production images. In some embodiments, for example, with Web-based systems, the interactive application 102 is running on a computing device separate from the interactive computing device. In other embodiment, the interactive application runs on the interactive computing device. In such an embodiment, computing device 101 and computing device 138 of FIG. 1 are the same computing device.

Figure 4:
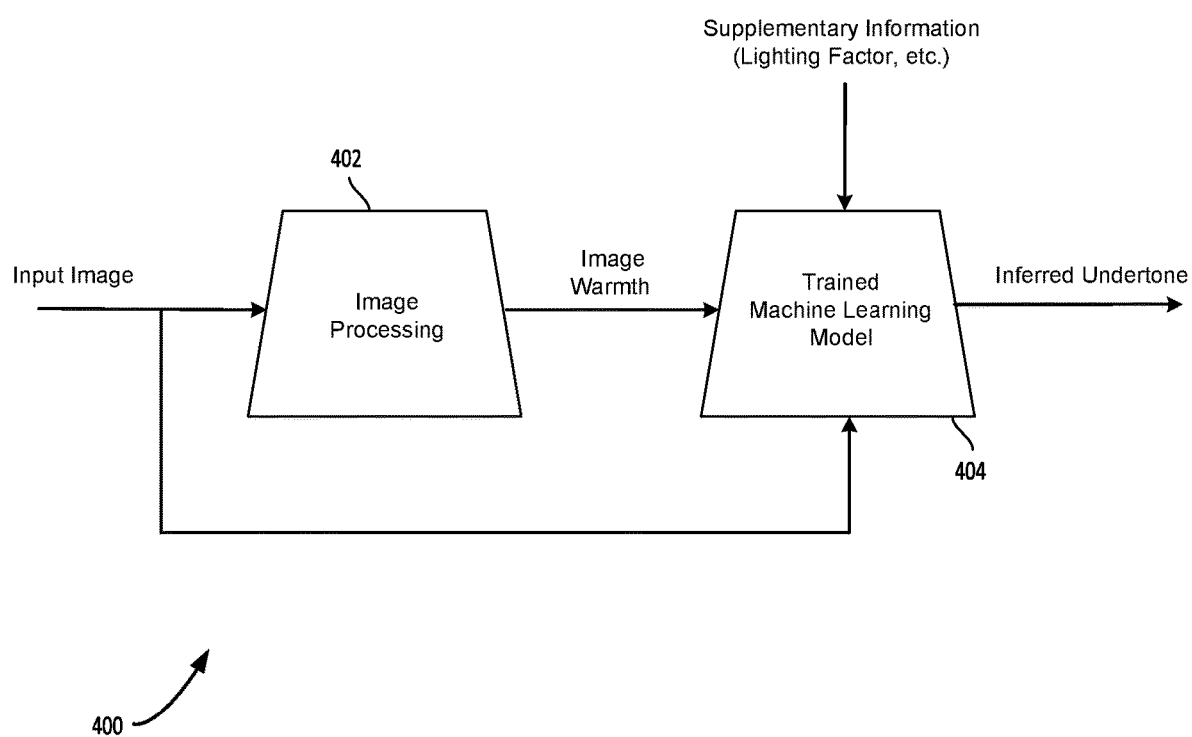
FIG. 4 is a block diagram of an example of a system used in chromatic undertone detection, according to certain embodiments.

FIG. 4 is a block diagram of an example of a system 400 used in chromatic undertone detection, according to certain embodiments. System 400 provides an inferred undertone based on an input image. Additional modules and/or algorithms are used to make selections of purchases or other items based on the inferred undertone. Once an inferred undertone is obtained using system 400, the inferred undertone can be used for any purpose. System 400 includes image processing algorithm 402, which supplies information about images to the surface-image-trained, machine learning model 404, which in turn provides the inferred undertone. In this example, machine learning model 404 also receives a copy of the input image itself.

Supplementary information regarding the conditions under which the input image was captured or the subject, environment, or surface(s) pertaining to the input image may be input to the surface-image-trained machine learning model 404 in order to improve inferred undertone detection accuracy. The input of a lighting factor from a lighting factor module has already been discussed. Standardized questions in a survey may also be used to prompt additional input. For example, in systems used to evaluate undertones for cosmetics or clothing recommendations, responses to questions such as what color appears to be present where veins are visible on one's body and/or how one's skin reacts to sunlight can be used. This information is used as additional data for making inferred undertone determinations to improve accuracy. Another example of supplementary information that can be used in a wide variety of situations is an indication of what neutral colors (white, gray, black) are present in an image. Information about the source of the image can also be used, for example, whether the image was captured as a still image or is a frame from a video clip.

Figure 5:
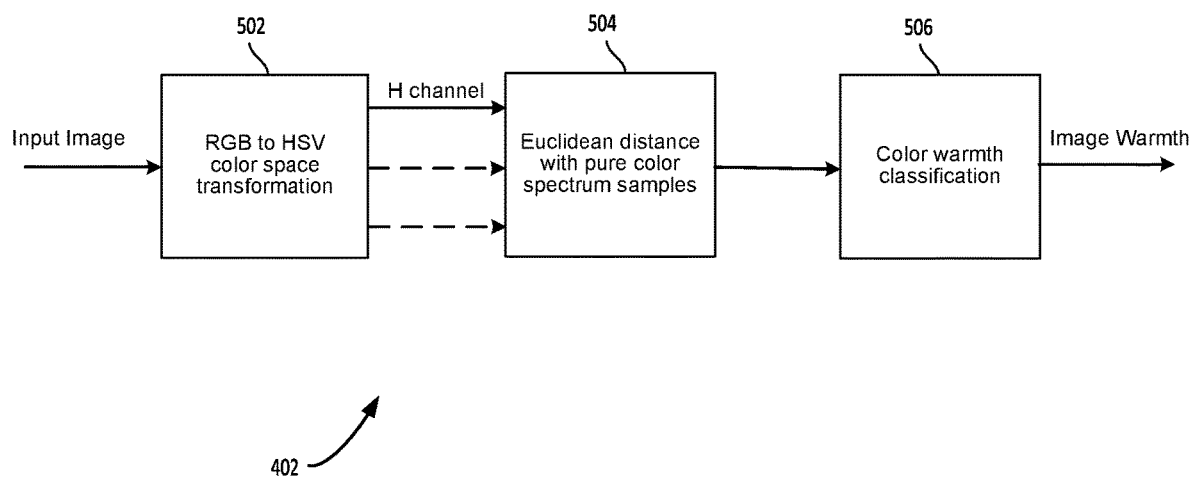
FIG. 5 is a block diagram of an example of another system used in chromatic undertone detection, according to certain embodiments.

FIG. 5 is a block diagram of an example of the image processing algorithm 402 of the system 400 of FIG. 4 used in chromatic undertone detection, according to certain embodiments. In order to provide information for color warmth classification, color temperature analysis is carried out by the system. Warm colors typically have undertones that are orange, yellow, or red, while cool colors have undertones that are green, blue, or purple. To this end, the input image is transformed from the given representation in which it is input (typically RGB values) to hue saturated values (HSVs). In this example, the linear transformation module 502 is used to transform the image from the RGB space into the HSV space. The HSV space is a perceptual space in which Euclidean distances between pixel values correspond to differences in perceived color. HSV values are provided to a distance module 504 using hue values (referred to as the H channel). Euclidean distances are calculated using the distance between the hues of the input image and the hues corresponding to a stored sample of the visual spectrum (purple, blue, green, yellow, orange, red). Color warmth classifier 506 provides the image warmth for an unsegmented image or the image warmth profile for a segmented image. The image warmth can be described as an image warmth category for the image or for each of a number of segments in the case of a segmented image. The HSV color space characterizes colors based on saturation level and color value. Other color spaces using different descriptive frameworks can be used.

Image warmth can be expressed by the color warmth classifier as a continuous number by using a floating point value in order to achieve high accuracy and granularity. However, processing efficiency can be improved by expressing it as discrete values. Such an implementation may be convenient for systems implemented using less capable hardware, for example, in systems where the image processing is taking place on a mobile computing device. As an example, discrete values may include numerical designators for warm, very warm, neutral, cool, very cool, etc. The system design in such a case would need to include thresholds at which color warmth would be moved from one category into another. The system can then treat color and/or color warmth as a range corresponding to a number in making certain calculations, which may result in larger selections of production images being returned if additional filtering is not used.

Figure 6:
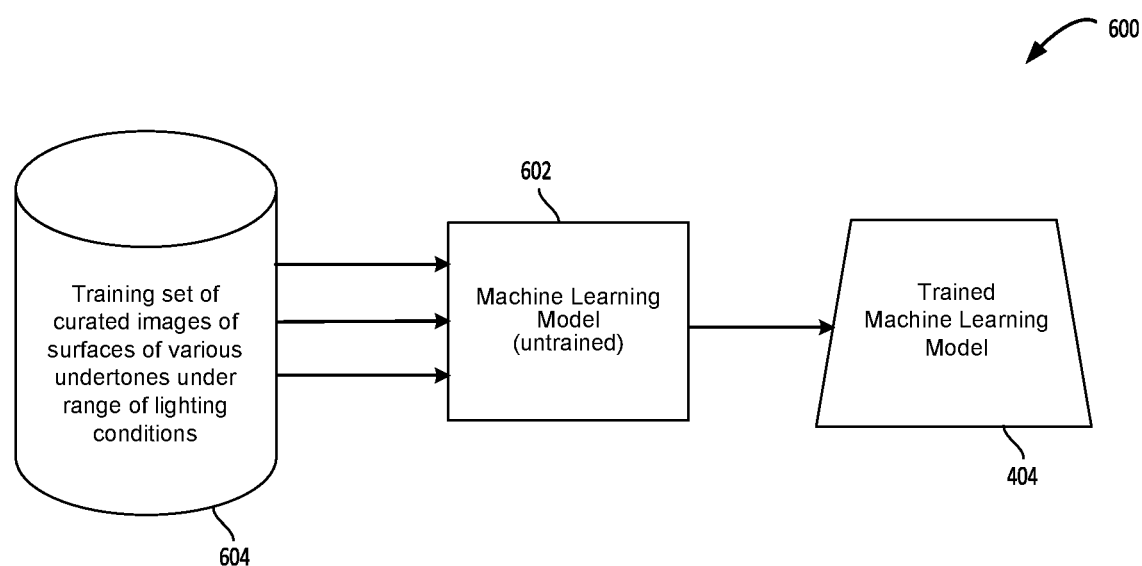
FIG. 6 is a block diagram of an example of an additional system used in comparative chromatic undertone detection, according to certain embodiments.

FIG. 6 is a block diagram illustrating a system 600 used in chromatic undertone detection, according to certain embodiments. System 600 trains a machine learning model 602 with images of various surfaces ("surface images") to produce the surface-image-trained machine learning model 404. A training set of images 604 curated for the purpose of the training so that the surface-image trained machine learning model 404 infers the undertone(s) in the input image. In some examples, the training set is curated offline at some point before the interactive application is deployed. Updated, trained models can be provided with at least some software version updates.

The training set includes of images of common surfaces. For each of the training images in training set 604, the image is transformed to the HSV color space using linear transformation. HSV values are used to calculate Euclidean distance between the hues of the training image and the hues corresponding to the same stored sample of the visual spectrum to be used in analyzing new images. The training set includes images of various surfaces with various undertones. Each surface is imaged under a range of lighting conditions and each image is stored with the undertone and lighting factor identified. The images in the training set are processed by the same image processing algorithm used to process images input to the interactive application, and image warmth color vectors are generated. The image warmth color vectors along with the lighting factor values are used as the training data for the machine learning model.

A deployed surface-image-trained machine learning model can be retrained at regular intervals either manually or automatically. For example, new curated images can be input to improve the performance of the trained model to initiate retraining manually. Alternatively, feedback regarding production images provided for selection via the recipient device can be obtained via the same or a different interactive computing device and can be used to automatically retrain the model over time to provide more accurate determinations of inferred undertones.

Figure 7:
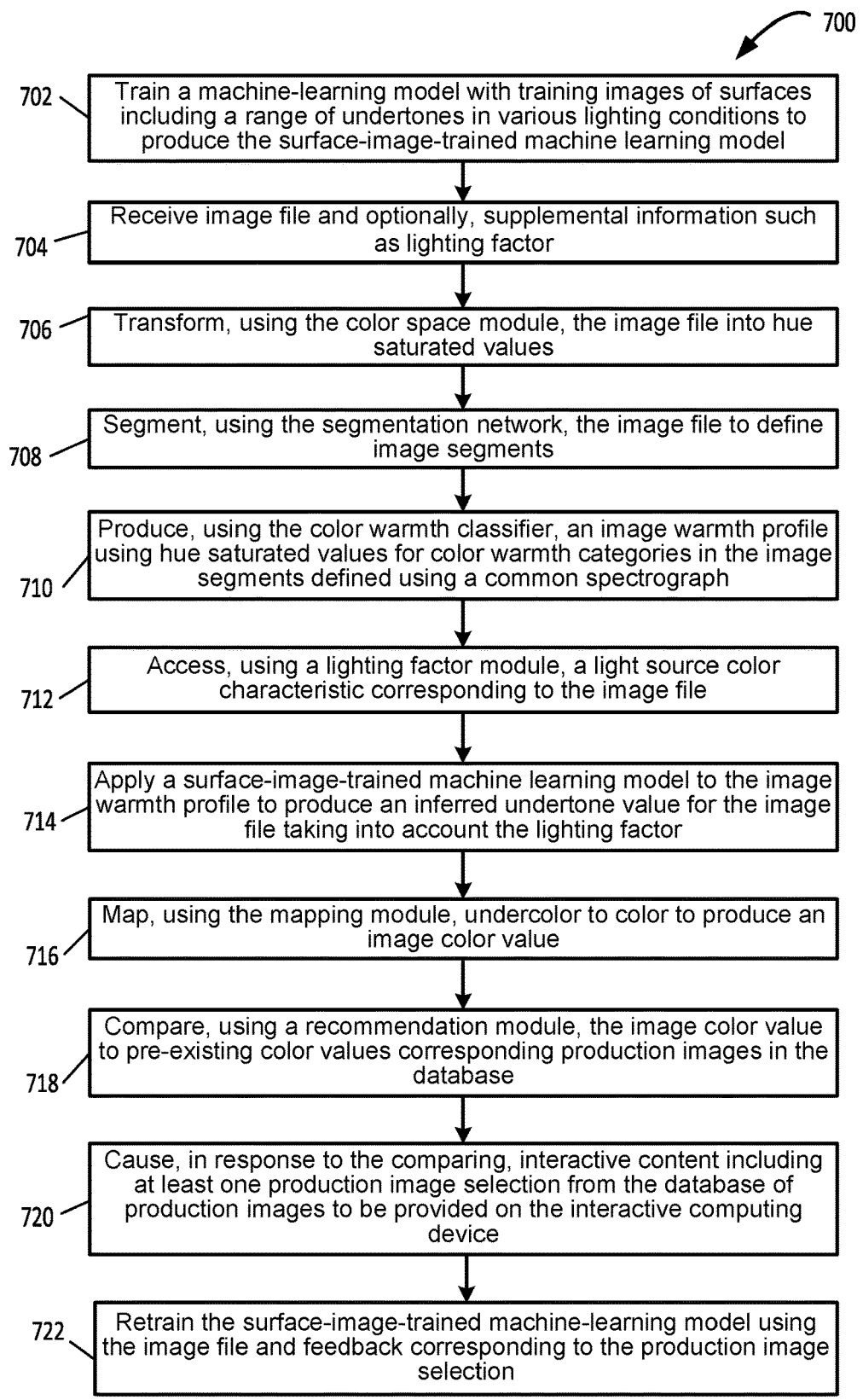
FIG. 7 is a flowchart of another example of a process for comparative undertone detection, according to some embodiments.

FIG. 7 is a flowchart of another example of a process 700 for a chromatic undertone detection system, according to some embodiments. In this example, a computing device carries out the process by executing suitable program code, for example, computer program code for an interactive application such as application 102. At block 702, the computing device trains a learning model with training images of surfaces including a range of undertones in various lighting conditions. At block 704, the computing device running the interactive application receives an image file from the interactive computing device such as interactive computing device 138 or directly through an interface module such as interface module 130. Optionally, the computing device can also receive supplementary information. The input of a lighting factor from a lighting factor module has already been discussed. Standardized questions in a survey may also be used to prompt additional input. For example, what color appears to be present on one's body and how one's skin reacts to sunlight.

Another example of supplementary information that can be used in a wide variety of situations is an indication of what neutral colors (white, gray, black) are present in an image. Optionally, for improved undertone recognition, the system can prompt for an image including such a neutral color to be provided. The image may be a person wearing a white or black shirt, and this information can be noted through a survey for supplementary information that includes other prompts to gather information.

At block 706 of FIG. 7, the computing device transforms the image file into HSVs using the color space module. At block 708, the computing device uses the segmentation network to segment the image file, defining multiple image segments. At block 710, the computing device uses the color warmth classifier to produce an image warmth profile using the HSVs for color warmth categories in the image segments. The image warmth profile is defined using a common spectrograph. At block 712, the computing device accesses a lighting factor module to obtain the lighting factor for the input image, for example, a light source color characteristic corresponding to the type of light in the image file.

Continuing with FIG. 7, at block 714, the surface-image-trained machine learning model is applied to the image warmth profile, taking into account the lighting factor, to produce the inferred undertone for the image file. The functions included in blocks 706 through 714, all discussed with respect to FIG. 7, can be used in implementing a step for producing an inferred undertone value for the image file. At block 716, the computing device maps the inferred undertone, or inferred undercolor, to a color to produce an image color value using the mapping module, optionally using supervised machine learning as previously described. For example, the image color value may correspond to one or more potential colors of items represented in production images. At block 718, the recommendation module of the computing device compares the image color value to pre-existing color values corresponding to the production images in the database.

At block 720, the computing device causes, in response to the comparison, interactive content including at least one production image selection from the database to be provided to the interactive computing device. The functions included in blocks 716 through 720, all discussed with respect to FIG. 7, can be used in implementing a step for causing interactive content including a production image selection to be provided to the interactive computing device. In addition to production images, the content may include a description of items in the production images, review information, information about the best matches to the inferred undertone, etc. The interactive content can also include as examples, the undertone determined by the system, a return rate, and/or computer-generated comments regarding feedback for products corresponding to the production images with respect to previous purchases for the determined undertone. Filter parameters can include those that determine how much or how little of such information is provided on the interactive computing device.

At block 722 in FIG. 7, the surface-image-trained machine learning model is optionally retrained using feedback corresponding to the production image selection. For example, if input is received that indicates the production images show poor compatibility with the inferred undertone, this data point can be taken into account to retrain, or update the training of, the surface-image-trained machine learning model. In some examples, such input over time provides feedback either confirming or rejecting many production image selections, and this feedback is used to automatically retrain the model and improve its performance over time.

Figure 8:
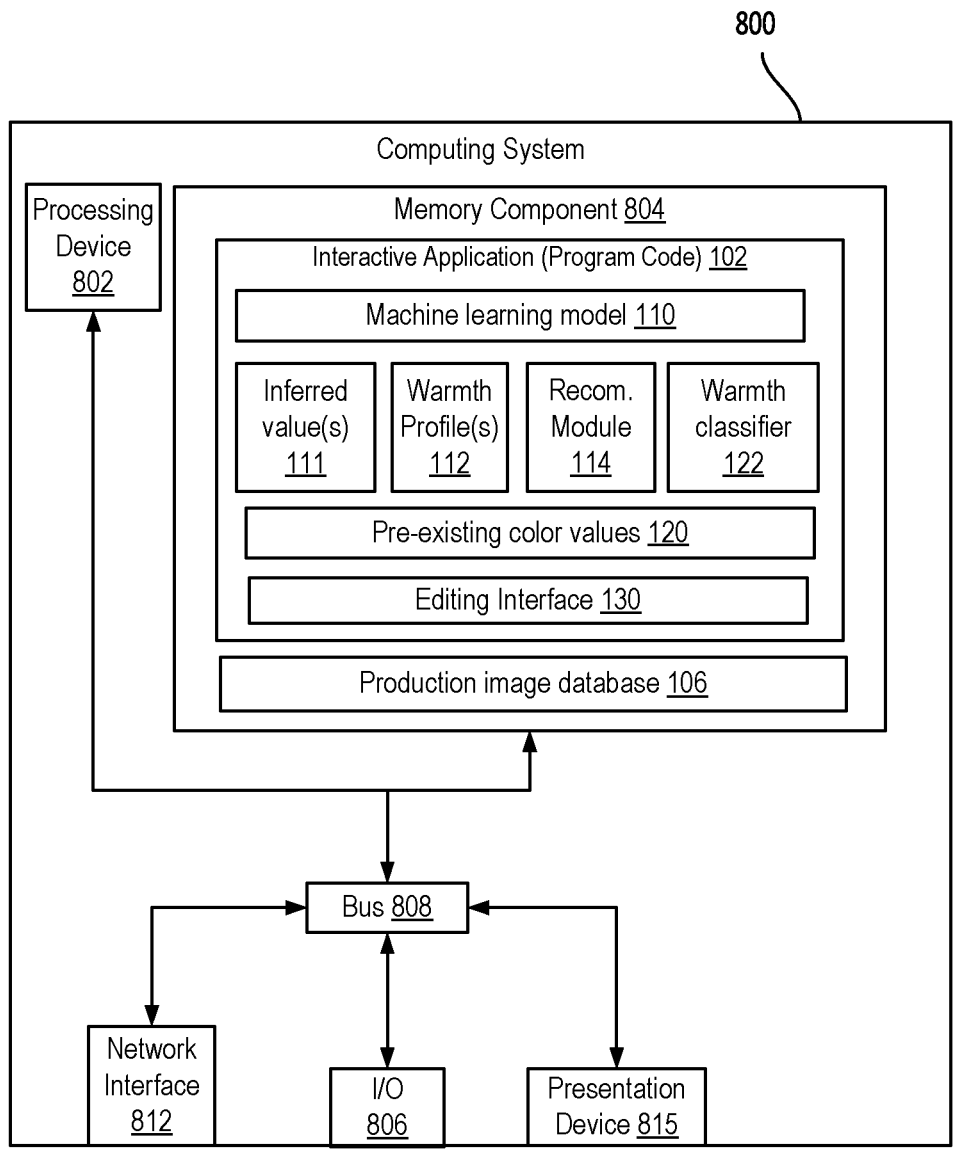
FIG. 8 is a diagram of an example of a computing system that can implement aspects of chromatic undertone detection, according to certain embodiments.

FIG. 8 depicts a computing system 800 that executes the interactive application 102 with the capability of chromatic undertone detection according to embodiments described herein. System 800 includes a processing device 802 communicatively coupled to one or more memory components 804. The processing device 802 executes computer-executable program code stored in the memory component 804. Examples of the processing device 802 include a processor, a microprocessor, an application-specific integrated circuit ("ASIC"), a field-programmable gate array ("FPGA"), or any other suitable processing device. The processing device 802 can include any number of processing devices, including a single processing device. The memory component 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read executable instructions. The executable instructions may include processor-specific instructions generated by a compiler or an interpreter from code written in any suitable computer-programming language, including, for example, C, C++, C#, Visual Basic, Java, Python, Perl, JavaScript, and ActionScript.

Still referring to FIG. 8, the computing system 800 may also include a number of external or internal devices, for example, input or output devices. For example, the computing system 800 is shown with one or more input/output ("I/O") interfaces 806. An I/O interface 806 can receive input from input devices such as a camera to capture images to be provided as image files or provide output to output devices (not shown), for example, to display production image selections. One or more buses 808 are also included in the computing system 800. The bus 808 communicatively couples one or more components of a respective one of the computing system 800.

The processing device 802 executes program code (executable instructions) that configures the computing system 800 to perform one or more of the operations described herein. The program code includes, for example, interactive application 102 or other suitable applications that perform one or more operations described herein. The program code may be resident in the memory component 804 or any suitable computer-readable medium and may be executed by the processing device 802 or any other suitable processing device. Memory component 804, during operation of the computing system, executable portions of the interactive application, for example, machine learning model 110, recommendation module 114, color warmth classifier 122, and/or editing interface 130, can access portions as needed. Memory component 804 is also used to temporarily store inferred undertone values 111, image warmth profiles 112, and pre-existing color values 120, as well as other information or data structures, shown or not shown in FIG. 8. Memory component 804 may also store production image database 106 if the production image database is to be maintained locally on computing system 800.

The system 800 of FIG. 8 also includes a network interface device 812. The network interface device 812 includes any device or group of devices suitable for establishing a wired or wireless data connection to one or more data networks. Non-limiting examples of the network interface device 812 include an Ethernet network adapter, a wireless network adapter, and/or the like. The system 800 is able to communicate with one or more other computing devices (e.g., another computing device executing other software, not shown) via a data network (not shown) using the network interface device 812. Network interface device 812 can also be used to communicate with network or cloud storage used as a repository for production images for use with the interactive application 102. Such network or cloud storage can also include updated or archived versions of the interactive application for distribution and installation.

Staying with FIG. 8, in some embodiments, the computing system 800 also includes the presentation device 815 depicted in FIG. 8. A presentation device 815 can include any device or group of devices suitable for providing visual, auditory, or other suitable sensory output. In examples, presentation device 815 displays production image selections. Non-limiting examples of the presentation device 815 include a touchscreen, a monitor, a separate mobile computing device, etc. In some aspects, the presentation device 815 can include a remote client-computing device that communicates with the computing system 800 using one or more data networks. System 800 may be implemented as a unitary computing device, for example, a notebook or mobile computer. Alternatively, as an example, the various devices included in system 800 may be distributed and interconnected by interfaces or a network with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "determining," and "identifying" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" or "based on" herein is meant as open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
receiving an image file;
prompting for additional input with respect to the image file;
receiving, in response to the prompting, an indication regarding neutral colors present in the image file;
producing, using a color warmth classifier, an image warmth profile including color warmth values indexed to segmented portions of an image from the image file;
applying, using the indication regarding neutral colors, a surface-image-trained machine-learning model to the image warmth profile to produce an inferred undertone value for the image file;
comparing, using a recommendation module and the inferred undertone value, an image color value to a plurality of pre-existing color values corresponding to a database of production images;
selecting, in response to the comparing, at least one production image from the database of production images, the at least one production image associated with a pre-existing color value corresponding to the image color value; and
causing, in response to the selecting, interactive content including the at least one production image from the database of production images to be provided to a recipient device.

2. The method of claim 1, further comprising accessing, using a lighting factor module, a light source color characteristic corresponding to the image file, wherein the light source color characteristic is used in producing the inferred undertone value.

3. The method of claim 1, further comprising transforming, using a color space module, the image file into hue saturated values, wherein producing the image warmth profile uses the hue saturated values.

4. The method of claim 1, further comprising training a machine learning model with training images of surfaces including a range of undertones in a plurality of lighting conditions to produce the surface-image-trained machine-learning model.

5. The method of claim 4, further comprising retraining the surface-image-trained machine-learning model using the image file and feedback corresponding to the at least one production image.

6. The method of claim 1, further comprising segmenting, using a segmentation network, the image file to define the segmented portions, wherein the image warmth profile further includes image warmth categories corresponding to the segmented portions.

7. The method of claim 1, further comprising:
producing, using the color warmth classifier, a common spectrograph defining the image warmth profile using a standard selection of values across the segmented portions for both the image file and the production images; and
mapping, using a mapping module, undercolors to colors to produce the image color value using the inferred undertone value.

8. A system comprising:
a memory component;
a processing device coupled to the memory component to perform operations of receiving an image file, of prompting for additional input with respect to the image file, of receiving, as the additional input, an indication regarding a neutral color present in the image file, and of causing interactive content including at least one production image to be transmitted or displayed in response to receiving the image file:
a color warmth classifier, configured to produce an image warmth profile including color warmth values indexed to segmented portions of an image from the image file;
a surface-image-trained machine-learning model configured to use the image warmth profile and the indication regarding the neutral color, to produce an inferred undertone value for the image file using the image warmth profile; and
a recommendation module configured to determine an image color value from the inferred undertone value, compare the image color value to a plurality of pre-existing color values corresponding to a database of production images, and to select the at least one production image based on the comparing.

9. The system of claim 8, further comprising a lighting factor module configured to provide a light source color characteristic corresponding to the image file, wherein the light source color characteristic is used in producing the inferred undertone value.

10. The system of claim 8, further comprising a color space module configured to transform the image file into hue saturated values, wherein producing the image warmth profile uses the hue saturated values.

11. The system of claim 8, wherein the surface-image-trained machine-learning model is configured with training images of surfaces including a range of undertones in a plurality of lighting conditions.

12. The system of claim 8, further comprising a segmentation network configured to segment the image file to define the segmented portions, wherein the image warmth profile further includes image warmth categories corresponding to the segmented portions.

13. The system of claim 8, wherein the color warmth classifier is configured to produce a common spectrograph defining the image warmth profile using a standard selection of values across the segmented portions for both the image file and the production image.

14. The system of claim 8, further comprising a mapping module configured to map undercolors to colors to produce an image color value using the inferred undertone value.

15. A non-transitory computer-readable medium storing executable instructions, which when executed by a processing device, cause the processing device to perform operations comprising:
receiving an image file using an interactive computing device;
prompting for additional input with respect to the image file;
receiving, in response to the prompting, an indication regarding a neutral color present in the image file;

a step for producing, using the indication regarding the neutral color, an inferred undertone value for the image file; and a step for causing interactive content including a production image to be provided to the interactive computing device, the production image being selected according to the inferred undertone value as compared to a pre-existing color value from a database of production images.

16. The non-transitory computer-readable medium of claim 15, wherein the step for producing the inferred undertone value further comprises applying a surface-image-trained machine-learning model to an image warmth profile to produce the inferred undertone value for the image file.

17. The non-transitory computer-readable medium of claim 16, wherein the step for producing the inferred undertone value further comprises segmenting the image file to define a plurality of image segments, wherein the image warmth profile comprises image warmth categories corresponding to the plurality of image segments.

18. The non-transitory computer-readable medium of claim 16, wherein the executable instructions further cause the processing device to perform the operation of training a machine learning model with training images of surfaces including a range of undertones in a plurality of lighting conditions to produce the surface-image-trained machine-learning model.

19. The non-transitory computer-readable medium of claim 18, wherein the executable instructions further cause the processing device to perform the operation of retraining the surface-image-trained machine-learning model using the image file and feedback corresponding to the production image.

20. The non-transitory computer-readable medium of claim 15, wherein the step for causing interactive content including a production image to be provided further comprises mapping undercolors to colors to produce an image color value using the inferred undertone value.

* * * * *